United States Patent
Kezys et al.

(10) Patent No.: US 8,639,304 B2
(45) Date of Patent: Jan. 28, 2014

(54) METHOD OF CONTROLLING A PLURALITY OF INTERNAL ANTENNAS IN A MOBILE COMMUNICATION DEVICE

(75) Inventors: Vytautas Robertas Kezys, Ancaster (CA); Yihong Qi, Waterloo (CA)

(73) Assignee: BlackBerry Limited, Waterloo (CA)

(*) Notice: Subject to any disclaimer, the term of this patent is extended or adjusted under 35 U.S.C. 154(b) by 0 days.

(21) Appl. No.: 13/614,586

(22) Filed: Sep. 13, 2012

(65) Prior Publication Data

US 2013/0012143 A1    Jan. 10, 2013

Related U.S. Application Data

(63) Continuation of application No. 12/604,125, filed on Oct. 22, 2009, now Pat. No. 8,320,859, which is a continuation of application No. 11/252,319, filed on Oct. 17, 2005, now Pat. No. 7,627,296, which is a continuation-in-part of application No. 11/067,935, filed on Feb. 28, 2005, now Pat. No. 7,187,332.

(60) Provisional application No. 60/619,848, filed on Oct. 18, 2004.

(51) Int. Cl.
*H04M 1/00* (2006.01)
*H04B 1/16* (2006.01)

(52) U.S. Cl.
USPC ............. 455/575.7; 455/140; 455/277.1

(58) Field of Classification Search
USPC ........... 455/140, 575.7, 277.1, 132, 133, 134, 455/135, 575.1, 575.5
See application file for complete search history.

(56) References Cited

U.S. PATENT DOCUMENTS

| | | | |
|---|---|---|---|
| 4,513,412 A | 4/1985 | Cox | |
| 5,276,920 A | 1/1994 | Kuisma | |
| 5,430,769 A | 7/1995 | Patsiokas et al. | |
| 5,905,467 A | 5/1999 | Narayanaswamy et al. | |
| 6,023,610 A | 2/2000 | Wood, Jr. | |
| 6,167,312 A | 12/2000 | Goedeke | |
| 6,285,893 B1 | 9/2001 | Keirinbou | |
| 6,330,433 B1 | 12/2001 | Jager | |
| 6,628,962 B1 | 9/2003 | Katsura | |
| 6,653,978 B2 * | 11/2003 | Lahti | 343/702 |

(Continued)

FOREIGN PATENT DOCUMENTS

| | | |
|---|---|---|
| EP | 1206051 | 5/2002 |
| EP | 2398158 | 12/2011 |
| EP | 2400671 | 12/2011 |
| WO | 9955012 | 10/1999 |

OTHER PUBLICATIONS

CIPO, Office Action, Application No. 2,584,375, Dec. 14, 2010, 3 pgs.

(Continued)

*Primary Examiner* — Sonny Trinh
(74) *Attorney, Agent, or Firm* — The Danamraj Law Group, P.C.

(57) ABSTRACT

In one embodiment, a mobile communication device comprises a first antenna; a second antenna; a transceiver for processing a received signal and generating a transmit signal; and a controller, based on a detected condition of one of the first antenna or second antenna, for selecting the other one of said first antenna or said second antenna and coupling the transmit signal to the selected other one of said first antenna or said second antenna.

13 Claims, 7 Drawing Sheets

(56) References Cited

U.S. PATENT DOCUMENTS

| | | | |
|---|---|---|---|
| 6,678,532 B1 | 1/2004 | Mizoguchi | |
| 6,690,927 B1 | 2/2004 | Hupp | |
| 6,806,835 B2 | 10/2004 | Iwai et al. | |
| 6,862,433 B2 | 3/2005 | Callaway, Jr. | |
| 6,924,766 B2 * | 8/2005 | Tran | 343/702 |
| 6,965,353 B2 | 11/2005 | Shirosaka et al. | |
| 6,985,113 B2 | 1/2006 | Nishimura et al. | |
| 7,225,003 B2 | 5/2007 | Shoji et al. | |
| 7,251,503 B2 | 7/2007 | Shirakata et al. | |
| 7,352,801 B2 | 4/2008 | Ramakrishnan et al. | |
| 7,627,296 B2 | 12/2009 | Kezys et al. | |
| 7,778,678 B2 | 8/2010 | Kitamura et al. | |
| 8,159,399 B2 * | 4/2012 | Dorsey et al. | 343/702 |
| 2002/0085643 A1 | 7/2002 | Kitchener | |
| 2002/0094789 A1 | 7/2002 | Harano | |
| 2002/0106995 A1 | 8/2002 | Callaway, Jr. | |
| 2002/0107052 A1 | 8/2002 | Carlson | |
| 2002/0126094 A1 | 9/2002 | Junod et al. | |
| 2003/0210203 A1 | 11/2003 | Phillips et al. | |
| 2003/0228857 A1 | 12/2003 | Maeki | |

OTHER PUBLICATIONS

CIPO, Office Action, Application No. 2,584,375, Feb. 28, 2012, 3 pgs.
CIPO, Office Action, Application No. 2,584,375, Jul. 14, 2011, 3 pgs.
EPO Extended Search Report; App No. 05797178.0, May 19, 2009, 10 pgs.
EPO Communication Exam Report, Application No. 05797178.0, Sep. 1, 2009, 10 pgs.
EPO, Partial European Search Report, Application No. 11180976.0, Nov. 9, 2011, 5 pgs.
EPO, Extended Search Report, Application No. 11180976.0, Mar. 9, 2012, 7 pgs.
EPO, Partial European Search Report, Application No. 11180977.8, Nov. 18, 2011, 5pgs.
EPO, Extended Search Report, Application No. 11180977.8, Feb. 1, 2012, 8 pgs.
PCT Search Report and Written Opinion; Application No. PCT/CA2005001586, Jan. 10, 2006, 3 pgs.
PCT Preliminary Report, Application No. PCT/CA2005/001586, Apr. 24, 2007, 7 pgs.
PCT Search Report, Application No. PCT/CA2005/001586, Nov. 5, 2007, 4 pgs.
USPTO, Office Action, U.S. Appl. No. 11/252,319, filed Feb. 21, 2008, 14 pgs.
USPTO, Office Action, U.S. Appl. No. 11/252,319, filed Aug. 22, 2008, 10 pgs.
USPTO, Office Action, U.S. Appl. No. 11/252,319, filed Nov. 17, 2008, 10 pgs.
CIPO, Office Action, Application No. 2,584,375, Oct. 19, 2012, 6 pgs.
PCT, Search Report, Application No. PCT/CA2005001586, Oct. 5, 2007, 4 pgs.
USPTO, Office Action, U.S. Appl. No. 12/604,125, filed Apr. 11, 2012, 13 pgs.
USPTO, Notice of Allowance, U.S. Appl. No. 12/604,125, filed Jul. 25, 2012, 8 pgs.
Acampora, A.S. et al, "System Applications for Wireless Indoor Communications," IEEE Communications Magazine, V. 25, No. 8, Aug. 1987, pp. 11-20.
Bjerke et al, "Antenna Diversity Combining Schemes for WCDMA Systems in Fading Multipath Channels," IEEE Transactions on Wireless Communications, vol. 3, No. 1, Jan. 2004, 11 pgs.
Feeney, M.T., et al, "The Performance of Various Diversity Combiners on Signals Received at Base-Station Site," Oct. 12, 1965, pp. 55-62.
USPTO Office Action, U.S. Appl. No. 13/358,891, filed Nov. 26, 2012, 8 pgs.
USPTO, Office Action, U.S. Appl. No. 13/358,891, filed Mar. 21, 2013, 8 pgs.
USPTO, Office Action, U.S. Appl. No. 13/358,891, filed May 29, 2013, 8 pgs.
CIPO, Office Action, Application No. 2,584,375, Jul. 23, 2013, 5 pgs.
USPTO, Office Action, U.S. Appl. No. 13/358,891, Oct. 16, 2013, 8 pgs.

* cited by examiner

METHOD OF CONTROLLING A PLURALITY OF INTERNAL ANTENNAS IN A MOBILE COMMUNICATION DEVICE

CROSS-REFERENCE TO RELATED APPLICATIONS

This nonprovisional application is a continuation application claiming the benefit of the following prior United States patent application entitled: "METHOD OF CONTROLLING A PLURALITY OF INTERNAL ANTENNAS IN A MOBILE COMMUNICATION DEVICE", filed Oct. 22, 2009, application Ser. No. 12/604,125 , which claims the benefit of U.S. patent application Ser. No. 11/252,319, filed Oct. 17, 2005, now issued U.S. Pat. No. 7,627,296, which claims priority to U.S. Provisional Patent Application No. 60/619,848 filed on Oct. 18, 2004 and is a Continuation-in-Part of U.S. patent application Ser. No. 11/067,935 filed on Feb. 28, 2005. Each of the foregoing patent applications is incorporated herein by reference.

FIELD OF THE DISCLOSURE

The present disclosure relates to the field of antennas for handheld devices and more particularly to the optimization of a set of two or more antennas in a mobile communications device.

BACKGROUND OF THE DISCLOSURE

Mobile communication devices commonly use internal, rather than external, antennae for wireless communication. The reception and transmission quality of an internal antenna in a mobile communication device can be affected by the environment surrounding the device. For example, antenna performance can be negatively affected when a user's hand or other object covers or blocks all or part of the antenna. Accordingly, an internal antenna is often designed to compromise between two or more environments likely to be encountered in use, rather than being optimized for any one particular environment.

BRIEF DESCRIPTION OF THE DRAWINGS

Embodiments of the present disclosure will now be described by way of example with reference to attached figures, wherein.

DETAILED DESCRIPTION

Figure 1:
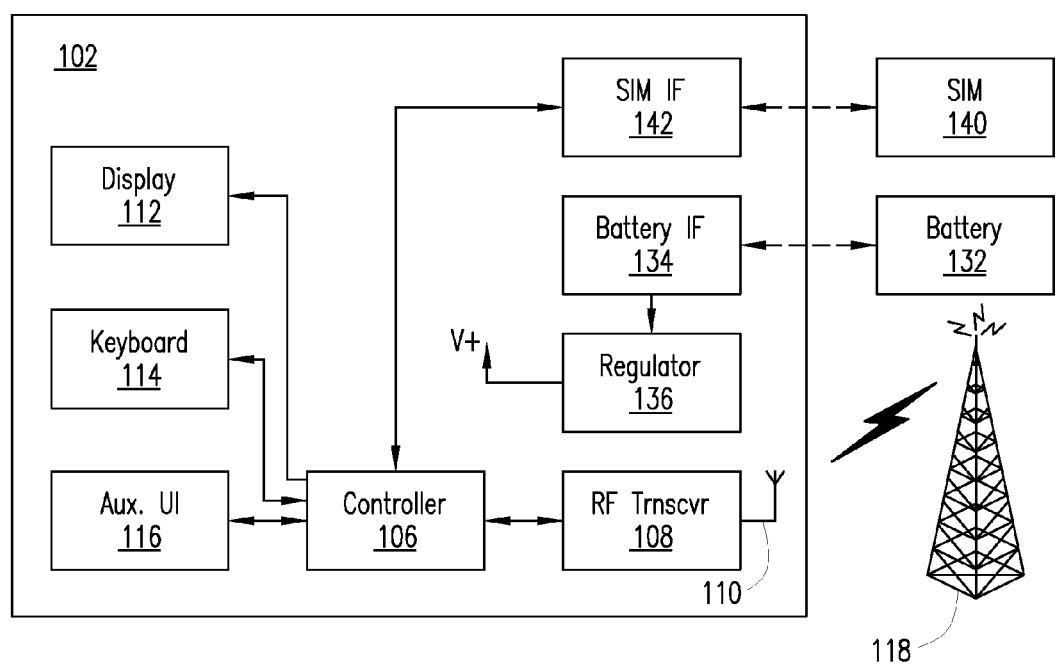
FIG. 1 is a block diagram illustrating pertinent components of a mobile communications device communicating within a wireless communication network according to one embodiment of the present disclosure.

By using multiple antennas in a diversity arrangement, a mobile communication device is operable to automatically optimize the best antenna or antenna combination in reaction to the device's immediate environment. The individual antenna designs can be optimized to provide high antenna system efficiency for a number of likely device environments.

According to a first aspect, the present disclosure relates to a mobile communication device comprises a first antenna; a second antenna; a transceiver for processing a received signal and generating a transmit signal; and a controller, based on a detected condition of one of the first antenna or second antenna, for selecting the other one of said first antenna or said second antenna and coupling the transmit signal to the selected other one of said first antenna or said second antenna.

According to second aspect, the present disclosure relates to a method of operating a mobile communications device having a housing, a wireless transceiver and a plurality of antennas connected to a wireless transceiver. The method comprises the steps of receiving a first received signal via a first antenna, receiving a second received signal via a second antenna and generating a resultant received signal from the first received signal and second received signal. The resultant received signal is generated using a signal transformation technique operable to manipulate the first and second received signals.

According to a third aspect, the present disclosure relates to a method of operating a mobile communications device having a housing and a plurality of antennas. The method comprises the steps of generating, from a raw outgoing signal (i.e., an unprocessed signal), first and second transformed outgoing signals for a first and second antenna according to a signal transformation technique responsive to at least a condition associated with the first and second antennas and transmitting the first and second transformed outgoing signals via the first and second antennas.

According to a fourth aspect, the present disclosure relates to a method of operating a mobile communication device having a housing and a plurality of antennas. The method comprises the steps of providing the plurality of antennas, determining which of the antennas are optimal for operation of the mobile communication device and selecting the optimal antennas for operation of the mobile communication device.

According to a fifth aspect, the present disclosure relates to a mobile communication device comprising a plurality of antennas operable in at least one frequency band, the antennas disposed substantially coplanar having varying degrees of polarity. The mobile communication device may comprise logic structure for determining which of the antennas are optimal for operation of the mobile communication device and logic structure for selecting the optimal antenna for operation of the mobile communication device.

According to a sixth aspect, the present disclosure relates to a method of operating a mobile communications device comprising receiving a first signal via a first antenna disposed on a plane; receiving a second signal via a second antenna disposed substantially coplanar with the first antenna wherein the first and second antenna have varying degrees of polarity;

and generating a resultant signal from the first received signal and second signal using a signal transformation technique operable to manipulate the first and second received signals.

According to a seventh aspect, the present disclosure relates to a method of operating a mobile communications device having a plurality of coplanar antennas having varying degrees of polarity. The method comprises generating, from a raw outgoing signal, first and second transformed outgoing signals for a first and second antenna according to a signal transformation technique responsive to at least a condition associated with the first and second antennas; and transmitting the first and second transformed outgoing signals via the first and second antennas.

FIG. 1 is a block diagram of a communication system 100 that includes a mobile communication device 102 that communicates through a wireless communication network. Mobile communication device 102 preferably includes a visual display 112, a keyboard 114, and perhaps one or more auxiliary user interfaces (UI) 116, each of which is coupled to a controller 106. Controller 106 is also coupled to radio frequency (RF) transceiver circuitry 108 and an antenna 110.

Typically, controller 106 is embodied as a central processing unit (CPU) which runs operating system software in a memory component (not shown). Controller 106 will normally control overall operation of mobile communication device 102, whereas signal processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard, is normally provided for entering data for storage in mobile communication device 102, information for transmission to network, a telephone number to place a telephone call, commands to be executed on mobile communication device 102, and possibly other or different user inputs.

Mobile communication device 102 sends communication signals to and receives communication signals from the wireless network over a wireless link via antenna 110. Although represented by a single icon for simplicity, antenna 110 may represent any number of separate antennas. RF transceiver circuitry 108 performs functions similar to those of a base station and a base station controller (BSC) (not shown), including for example modulation/demodulation and possibly encoding/decoding and encryption/decryption. It is also contemplated that RF transceiver circuitry 108 may perform certain functions in addition to those performed by a BSC. It will be apparent to those skilled in art that RF transceiver circuitry 108 will be adapted to particular wireless network or networks in which mobile communication device 102 is intended to operate.

Mobile communication device 102 includes a battery interface (IF) 134 for receiving one or more rechargeable batteries 132. Battery 132 provides electrical power to electrical circuitry in mobile communication device 102, and battery IF 134 provides for a mechanical and electrical connection for battery 132. Battery IF 134 is coupled to a regulator 136 which regulates power to the device. When mobile communication device 102 is fully operational, an RF transmitter of RF transceiver circuitry 108 is typically keyed or turned on only when it is sending to network, and is otherwise turned off to conserve resources. Similarly, an RF receiver of RF transceiver circuitry 108 is typically periodically turned off to conserve power until it is needed to receive signals or information (if at all) during designated time periods.

Mobile communication device 102 may operate using a Subscriber Identity Module (SIM) 140 which is connected to or inserted in mobile communication device 102 at a SIM interface (IF) 142. SIM 140 is one type of a conventional "smart card" used to identify an end user (or subscriber) of mobile communication device 102 and to personalize the device, among other things. In one embodiment, without SIM 140, the mobile communication device terminal is not fully operational for communication through the wireless network. By inserting SIM 140 into mobile communication device 102, an end user can have access to any and all of his/her subscribed services. SIM 140 generally includes a processor and memory for storing information. Since SIM 140 is coupled to SIM IF 142, it is coupled to controller 106 through communication lines 144. In order to identify the subscriber, SIM 140 contains some user parameters such as an International Mobile Subscriber Identity (IMSI). An advantage of using SIM 140 is that end users are not necessarily bound by any single physical mobile communication device. SIM 140 may store additional user information for the mobile communication device as well, including datebook (or calendar) information and recent call information.

Mobile communication device 102 may be comprised of a single unit, such as a data communication device, a multiple-function communication device with data and voice communication capabilities, a personal digital assistant (PDA) enabled for wireless communication, or a computer incorporating an internal modem. Alternatively, mobile communication device 102 may be a multiple-module unit comprising a plurality of separate components, including but in no way limited to a computer or other device connected to a wireless modem. In particular, for example, in the mobile communication device block diagram of FIG. 1, RF transceiver circuitry 108 and antenna 110 may be implemented as a radio modem unit that may be inserted into a port on a laptop computer. In this case, the laptop computer would include display 112, keyboard 114, one or more auxiliary UIs 116, and controller 106 embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above. Such a mobile communication device 102 may have a more particular implementation as described later in relation to mobile communication device 202 of FIG. 2.

Figure 2:
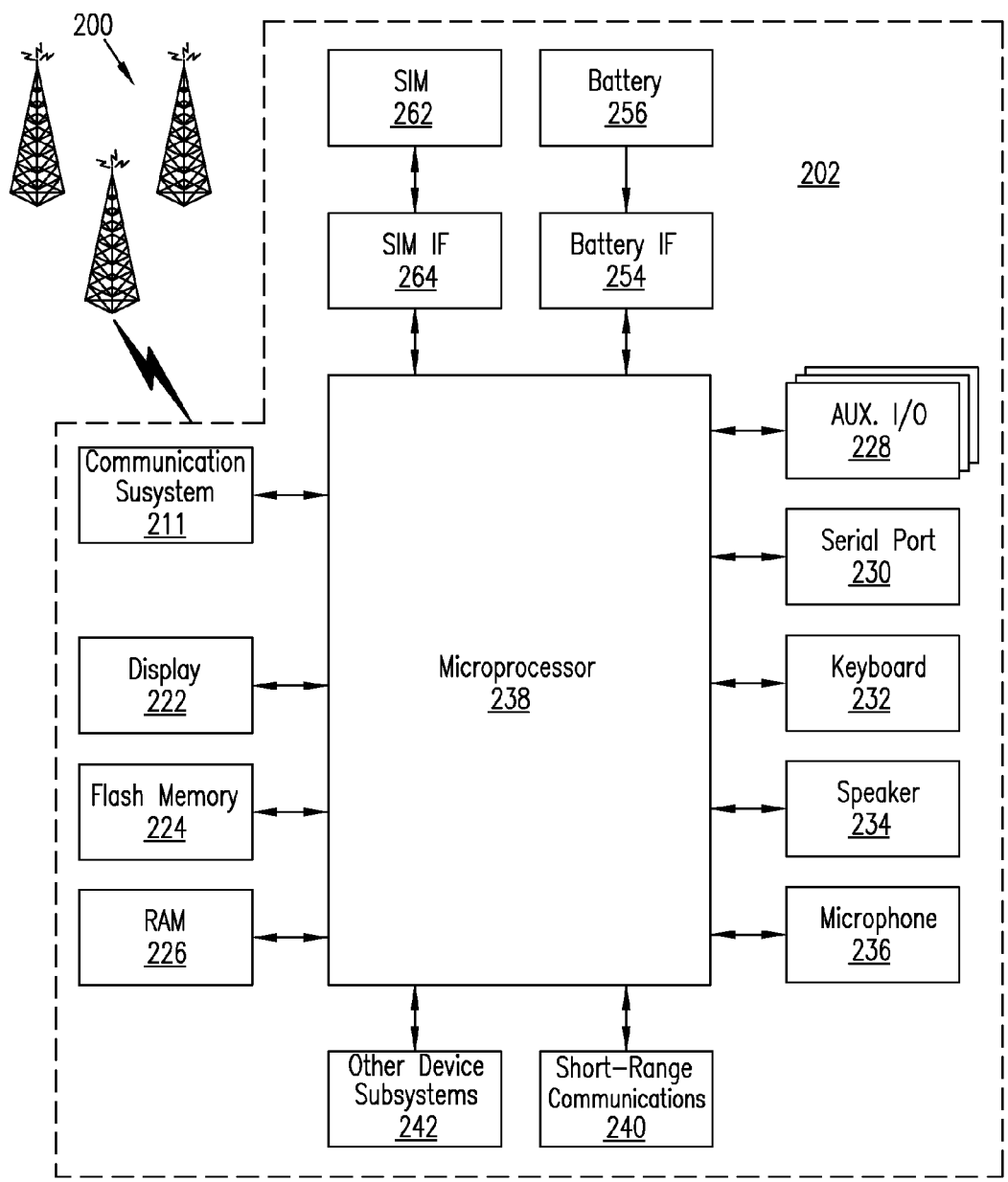
FIG. 2 is a more detailed diagram of an embodiment of the mobile communication device of FIG. 1 according to the present disclosure.

FIG. 2 is a detailed block diagram of a mobile communication device 202. Mobile communication device 202 is preferably a two-way communication device having at least voice and advanced data communication capabilities, including the capability to communicate with other computer systems. Depending on the functionality provided by mobile communication device 202, it may be referred to as a data messaging device, a two-way pager, a cellular telephone with data messaging capabilities, a wireless Internet appliance, or a data communication device (with or without telephony capabilities). Mobile communication device 202 may communicate with any one of a plurality of fixed transceiver stations 200 within its geographic coverage area.

Mobile communication device 202 will normally incorporate a communication subsystem 211, which includes a receiver, a transmitter, and associated components, such as one or more (preferably embedded or internal) antenna elements and, local oscillators (LOs), and a processing module such as a digital signal processor (DSP) (all not shown). Communication subsystem 211 is analogous to RF transceiver circuitry 108 and antenna 110 shown in FIG. 1. As will be apparent to those skilled in field of communications, particular design of communication subsystem 211 depends on the communication network in which mobile communication device 202 is intended to operate.

Network access is associated with a subscriber or user of mobile communication device 202 and therefore mobile communication device 202 may require a Subscriber Identity Module or "SIM" card 262 to be inserted in a SIM IF 264 in order to operate in the network. SIM 262 includes those features described in relation to FIG. 1. Mobile communication device 202 is a battery-powered device so it also includes a battery IF 254 for receiving one or more rechargeable batteries 256. Such a battery 256 provides electrical power to most if not all electrical circuitry in mobile communication device 202, and battery IF 254 provides for a mechanical and electrical connection for it. The battery IF 254 is coupled to a regulator (not shown) which provides power V+ to all of the circuitry.

Mobile communication device 202 includes a microprocessor 238 (which is one implementation of controller 106 of FIG. 1) which controls overall operation of mobile communication device 202. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile communication device 202. A predetermined set of applications which control basic device operations, including at least data and voice communication applications, will normally be installed on mobile communication device 202 during its manufacture. A preferred application that may be loaded onto mobile communication device 202 may be a personal information manager (PIM) application having the ability to organize and manage data items relating to the user such as, but not limited to, instant messaging (IM), e-mail, calendar events, voice mails, appointments, and task items. Naturally, one or more memory stores are available on mobile communication device 202 and SIM 262 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile communication device user's corresponding data items stored and/or associated with a host computer system thereby creating a mirrored host computer on mobile communication device 202 with respect to such items. This is especially advantageous where the host computer system is the mobile communication device user's office computer system. Additional applications may also be loaded onto mobile communication device 202 through a network of fixed transceiver stations 200, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile communication device 202 and may provide enhanced on-device functions, communication-related functions, or both. For example, secure communication applications may enable electronic commerce functions and other such financial transactions to be performed using mobile communication device 202.

In a data communication mode, a received signal such as a text message, an e-mail message, or web page download will be processed by communication subsystem 211 and input to microprocessor 238. Microprocessor 238 will preferably further process the signal for output to display 222, to auxiliary I/O device 228 or both as described further herein below with reference to FIGS. 3-7. A user of mobile communication device 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of mobile communication device 202 is substantially similar, except that the received signals would be output to speaker 234 and signals for transmission would be generated by microphone 236. Alternative voice or audio I/O subsystems, such as a voice message recording subsystem, may also be implemented on mobile communication device 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile communication device 202 by providing for information or software downloads to mobile communication device 202 other than through a wireless communication network. The alternate download path may, for example, be used to load an encryption key onto mobile communication device 202 through a direct and thus reliable and trusted connection to thereby provide secure device communication.

Short-range communications subsystem 240 of FIG. is an additional optional component which provides for communication between mobile communication device 202 and different systems or devices, which need not necessarily be similar devices. For example, subsystem 240 may include an infrared device and associated circuits and components, or a Bluetooth™ communication module to provide for communication with similarly-enabled systems and devices. Bluetooth™ is a registered trademark of Bluetooth SIG, Inc.

In accordance with an embodiment of the disclosure, mobile communication device 202 is a multi-tasking handheld wireless communications device configured for sending and receiving data items and for making and receiving voice calls. To provide a user-friendly environment to control the operation of mobile communication device 202, an operating system resident on communication device 202 (not shown) provides a GUI having a main screen and a plurality of sub-screens navigable from the main screen.

Figure 3:
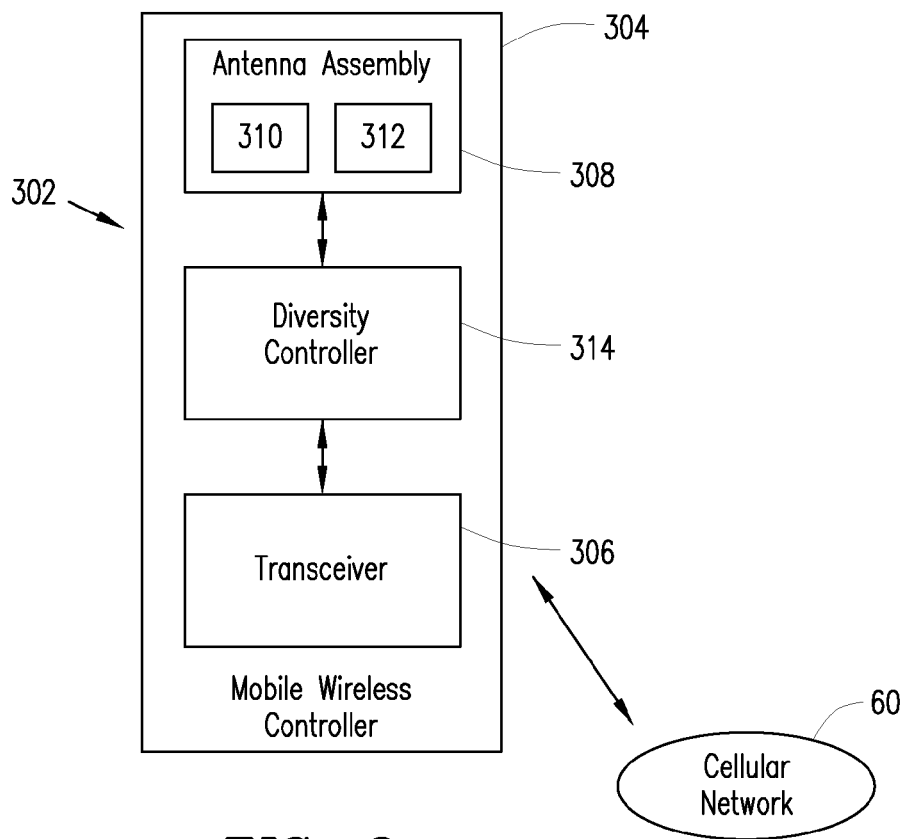
FIG. 3 illustrates a mobile communication device incorporating a dual antenna array and diversity controller according to one embodiment of the present disclosure.

FIG. 3 depicts an embodiment of a mobile communications device 302 in accordance with the present disclosure. The mobile communications device 302 illustratively includes a housing 304, and a wireless transceiver 306 disposed within the housing 304. The mobile communications device 302 also illustratively includes an antenna assembly 308 for cooperating with the wireless transceiver 306 to communicate over the wireless network described above. More particularly, the mobile communications device 302 may be a PDA-type device in which the wireless transceiver 306 and antenna assembly 308 cooperate to communicate various types of data, such as voice data, video data, text (e.g., email) data, Internet data, etc. over the wireless network. More specifically, the antenna assembly 308 may be used for placing telephone calls, in which case the mobile communication device 302 may generally take the form or shape of a typical cellular telephone or a cellular-enabled PDA device, for example.

The antenna assembly 308 includes a plurality of antennas, preferably a pair of an antennas 310, 312 as illustrated. The pair of antennas 310, 312 are positioned in side-by-side relation preferably in the upper portion of the housing 304. A diversity controller 314 is connected to the wireless transceiver 306 to preferentially operate with the pair of antennas 310, 312 to optimize reception based upon the environment within which the mobile communication device 302 is disposed.

The housing 304 preferably has opposing parallel front and back surfaces and the plurality of antennas 310, 312 are arranged in side-by-side relation extending in a plane parallel to the front and back surfaces. A display, a user input device and other components (not shown) may be carried by the housing 304 as discussed above. The transceiver 306 and the plurality of antennas 310, 312 are operable to communicate with fixed transceiver stations 200 as part of a cellular wireless network or a LAN wireless network. In certain embodiments, the wireless LAN may operate in accordance with various wireless LAN standards, such as IEEE 802.11/ 802.11b, Bluetooth™ or Zigbee™ for example, as will also be appreciated by those skilled in the art.

As discussed above, a mobile communication device will commonly use internal, rather than external, antennas for wireless communication. The reception and transmission quality of an internal antenna in a mobile communications device can, and generally will, be affected by the environment surrounding the device. For example, antenna performance can be negatively affected when a user's hand or other object covers or blocks all or part of the antenna. Accordingly, an internal antenna is often designed to compromise between two or more environments likely to be encountered in use, rather then being optimized for any one particular environment.

Figure 4:
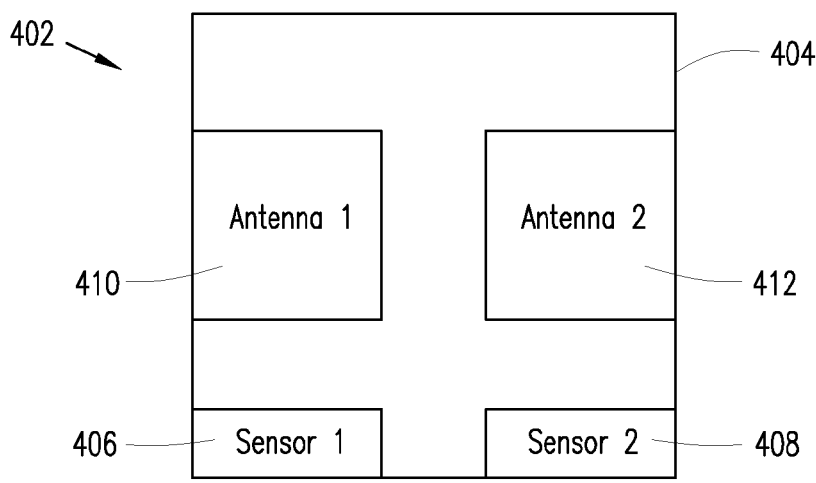
FIG. 4 illustrates a dual antenna array and dual sensor array according to one embodiment of the present disclosure.

FIG. 4 shows an embodiment of a mobile communication device 402 having a housing 404 in which two sensors 406, 408 are disposed. Each of sensors 406, 408 is associated with a corresponding antenna 410, 412. The antennas 410, 412 may have the same or a different form. In one embodiment, the two sensors 406, 408 may be used to determine whether one or both antennas are covered up by a user. In certain embodiments, one of antennas 410, 412 may be selected as a primary antenna.

Figure 5:
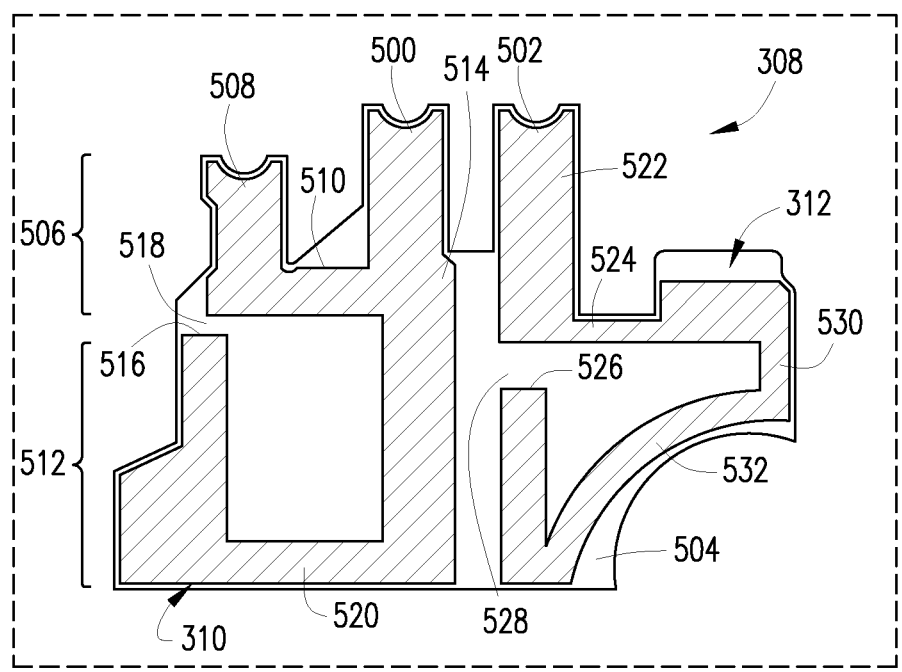
FIG. 5 illustrates a dual antenna layout according to one embodiment of the present disclosure.

Turning additionally to FIG. 5, further details of an embodiment of the antenna assembly 308 of FIG. 3 will be described. The antenna assembly 308 illustratively includes the first antenna 310 coupled to the transceiver 306 at a feed point 500 and having a first shape. The antenna assembly 308 also illustratively includes the second antenna 312 coupled to the wireless transceiver 306 at a feed point 502. It will be noted that second antenna 312 has a shape different from the shape of first antenna 310.

The polarizations of the first and second antennas 310, 312 may be orthogonal to one another in order to provide maximum polarization diversity, as will be appreciated by those skilled in the art. Of course, other arrangements may be possible in other embodiments.

The first and second antennas 310, 312 may advantageously be implemented as planar, printed radiative elements on a circuit board 504. The circuit board may be mounted on the back side of the mobile communication device 302 (i.e., the side pointing away from the user when holding the device to place a telephone call) or at the top of the mobile communication device (i.e., adjacent the end of the device with the ear speaker). First and second antennas 310, 312 are shown with hatching to provide greater clarity of illustration.

First antenna 310 illustratively includes a feed branch 506 including the first feed point 500, a second feed point 508 which is connected to ground, and a feed section 510 connected between the first and second feed points 500, 508. First antenna 310 further illustratively includes a loop branch 512 having a first end 514 coupled to the feed section 510 adjacent the first feed point 500. A second end 516 of the loop branch 512 is spaced apart from the feed section 510 by a gap 518, and the second end is adjacent the second feed point 508. A loop-back section 520 extends between the first and second ends 514, 516. More specifically, the loop-back section 520 generally loops in a clockwise direction from the first end 514 to the second end 516, as shown. First antenna 310 thus generally defines a dual feed point, open loop configuration. This configuration advantageously provides increased space savings (i.e., reduced antenna footprint), as will be appreciated by those skilled in the art.

The second antenna 312 also illustratively includes a feed branch defined by the feed point 502 and a feed section 522. Further, a loop branch having a first end 524 coupled to the feed section 522, a second end 526 adjacent the feed branch and separated therefrom by a gap 528, and a loop-back section 530 extending between the first and second ends. The loop-back section 530 illustratively includes an arcuate portion 532. The second antenna 312 thus defines a single feed point, open loop element configuration. Again, this provides space savings, and, thus, reduced antenna footprint.

As will be appreciated by those skilled in the art, various design parameters (e.g., widths, lengths, loop shapes, notches, etc.) may be altered in the first and second antennas 310, 312 to provide different signal characteristics. By way of example, the overall dimensions of the first and second antennas 310, 312 may be 2 to 3 cm high by 2 to 3 cm wide for each element, although other dimensions may also be used. The antennas 310, 312 preferably operate over a number of frequency bands and ranges, a wireless frequency range of about 2.4 to 2.5 GHz, for example, although other frequencies are also possible. Moreover, the coupling between the first and second antennas 310, 312 may also be adjusted to provide desired performance characteristics. By way of example, a preferred coupling distance or gap between the first and second antennas 310, 312 may be in a range of about 3 to 7 mm, although other gap distances may also be used as appropriate for different embodiments.

Because the first and second antennas 310, 312 have different shapes, they will also have different gain patterns, and thus advantageously provide pattern diversity, as will be appreciated by those skilled in the art. Moreover, the first and second antennas 310, 312 are preferably tuned to have substantially equal main lobe gain for enhanced performance. Of course, it will be appreciated that other antenna element shapes or types may be used in addition to those noted above. Electromagnetic shielding may be placed over one or both sides of the circuit board 504 as necessary in certain applications, as will also be appreciated by those skilled in the art.

One aspect of the present disclosure may include controlling the wireless transceiver 306 to preferentially operate with the pair of antennas 310, 312 based upon a relative position of the housing 304 with respect to a hand of a human user. Again, controlling the wireless transceiver 306 may include preferentially weighting transmit signals or preferentially switching one antenna on and one antenna off for transmit signals. Additional aspects will be appreciated by those skilled in the art from the foregoing description.

Figure 6A:
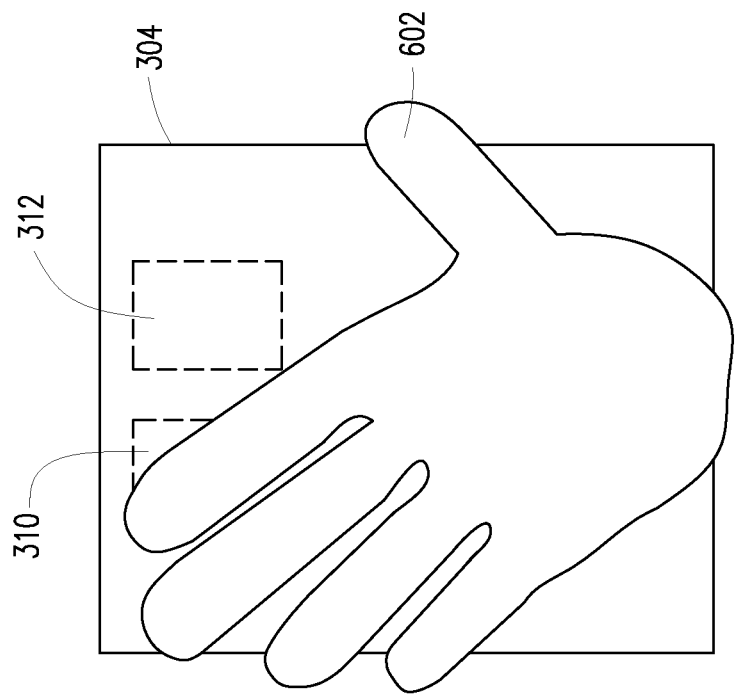
FIG. 6A illustrates a mobile communications device being held in a right hand.
Figure 6B:
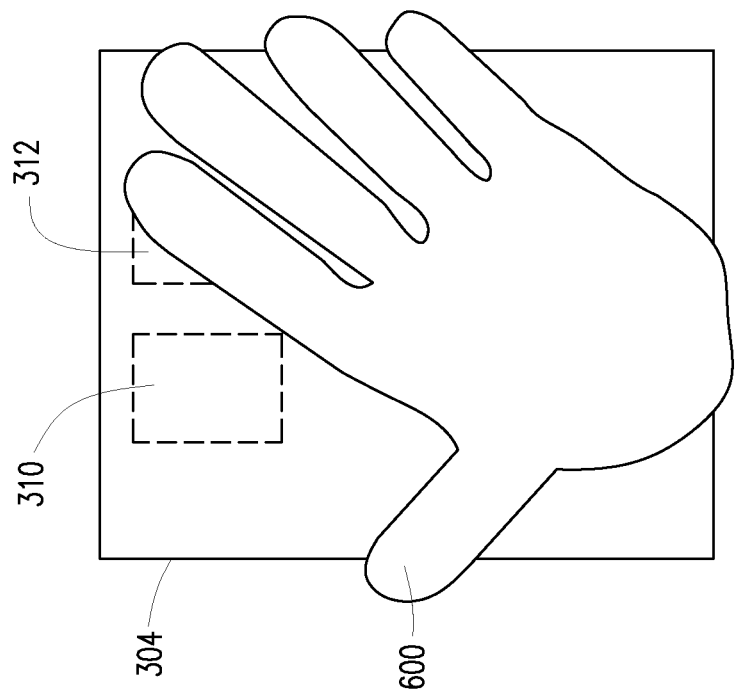
FIG. 6B illustrates a mobile communications device being held in a left hand.

Turning now to FIGS. 6A and 6B, an embodiment of the pair of antennas 310, 312 and associated diversity controller 314 of mobile communication device 302 will be described with respect to ergonomic aspects of device handling by users. Firstly, by using multiple antennas 310, 312, mobile communication device 302 can select the best antenna, or weighted or otherwise processed combination, based upon the environment surrounding the device. The environment generally includes, but is not limited to, portions of the device user's body, including the user's hands. Accordingly, the FIGS. 6A and 6B depict situations in which the antenna reception is affected by a user's hand 600 covering a portion of the housing 304, though similar situations arise when, for example, a portion of the housing 304 is covered by a user's head or clothing.

The antennas 310, 312 are designed to provide an overall high antenna system efficiency for the common user holding positions. The figures respectively illustrate a user holding the device 302 in a right hand 600 and a left hand 602. As can be seen, a user's hand 600, 602 may be directly adjacent one of antennas 310, 312, thereby affecting the performance of one or both of antennas 310, 312. Accordingly, the associated diversity controller 314 will preferentially operate the pair of antennas 310, 312 to provide optimized signal transmission/reception. In FIG. 6A, the user's right hand 600 is partially blocking antenna 312, while leaving antenna 310 unobstructed. In FIG. 6B, the user's left hand 602 is partially blocking antenna 310, while leaving antenna 312 unobstructed. In either case, either of the unobstructed antennas may nevertheless have their signals affected by the proximity of the user's hand. Conversely, either of the partially obstructed antennas may nevertheless retain the capability to transmit or receive some level of signal, though reduced in strength or quality. In certain embodiments, diversity controller 314 may employ one or more partially obstructed antennas. In certain embodiments, diversity controller 314 may perform some form of signal transformation or conditioning in order to compensate for the effect of the obstruction or other interference.

The diversity controller 314 (shown in FIG. 3) processes incoming and outgoing signals in order to optimize the use of antennas 310, 312. Diversity controller 314 may, for example, preferentially weight transmit signals, or switch at least one antenna on and at least one antenna off, for example, based upon received signal strength. Other processing methods will be known to those of skill in the art. The plurality of antennas 310, 312 may be operable on a common frequency, have different polarizations, have different conductive patterns or have different frequencies for transmit and receive, depending on the particular application.

Figure 7:
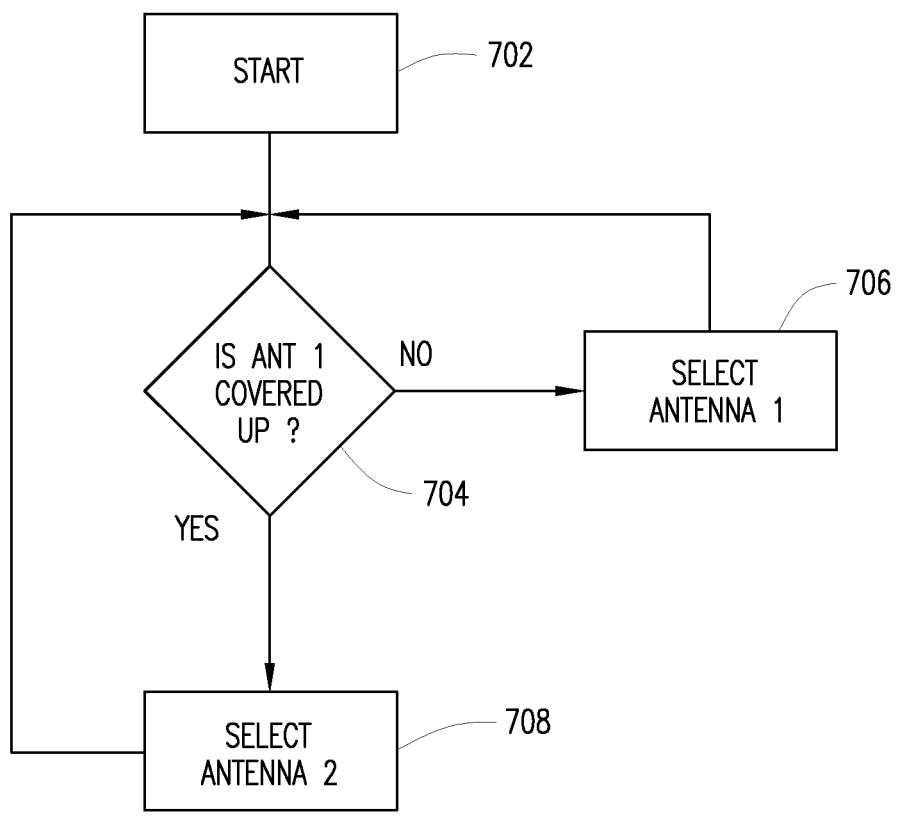
FIG. 7 illustrates a flowchart of a method for selecting an antenna according to one embodiment.

FIG. 7 shows an embodiment of a method for selecting between multiple antennas. Although the flowchart of FIG. 7 relates to a dual antenna arrangement, it is to be understood that a similar method may be employed for a device having more than two antennas. Process flow begins at block 702. In decision block 704, the diversity controller inquires whether antenna 1 is obstructed. This may be determined, for example, by a sensor corresponding to antenna 1, or by the existence of very weak signal reception at antenna 1. If antenna 1 is not obstructed, the diversity controller selects antenna 1 for communication (block 706). If antenna 1 is obstructed, the diversity controller selects antenna 2 for communication (block 708).

Figure 8A:
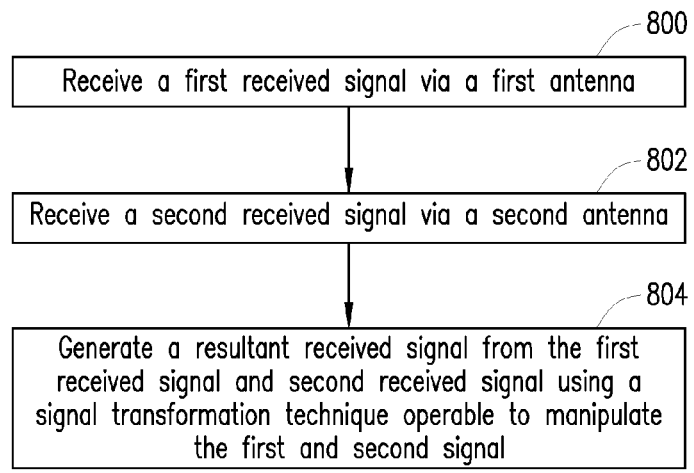
FIG. 8A illustrates a flowchart of a method for optimizing antenna usage according to one embodiment.

FIG. 8A depicts one embodiment of a method for optimizing antenna usage in a receive mode. In block 800, diversity controller 314 receives a first received signal via a first antenna. In block 802, diversity controller 314 receives a second received signal via a second antenna. In block 804, diversity controller 314 generates a resultant received signal from the first received signal and second received signal using a signal transformation technique operable to manipulate the first and second received signals. In certain embodiments, the signal transformation technique may constitute amplification of one or both of the received signals. In certain embodiments, the signal transformation technique may constitute attenuation of one or both of the received signals. Other signal processing techniques, such as filtering and phase shifting techniques, may be employed in particular applications. In certain embodiments, the signal transformation technique is selected or optimized based on the characteristics of one or more of the received signals.

Figure 8B:
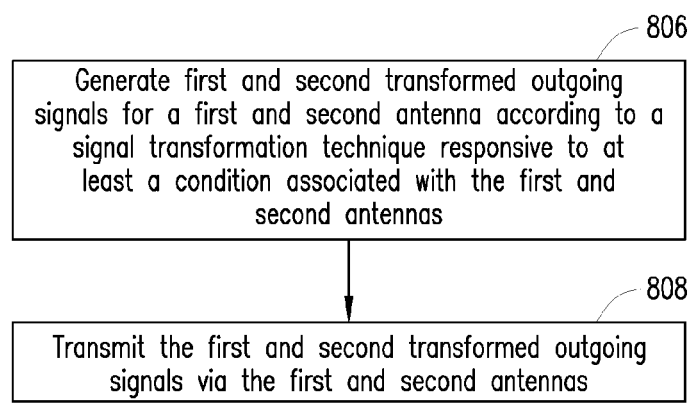
FIG. 8B illustrates a flowchart of a method for optimizing antenna usage according to one embodiment.

FIG. 8B depicts one embodiment of a method for optimizing antenna usage in a transmit mode. In block 806, the diversity controller 314 generates, from a raw outgoing signal, first and second transformed outgoing signals for a first and second antenna. The transformed outgoing signals are generated according to a signal transformation technique responsive to at least one condition associated with the first and second antennas. The condition may relate, for example, to the relative strength of received signals or the state of certain sensors. Signal transformation may include one or more of a number of signal processing techniques, such as amplification, attenuation, filtering and phase shifting techniques, as examples. In block 808, the diversity controller transmits the first and second transformed outgoing signals via the first and second antennas.

Figure 9:
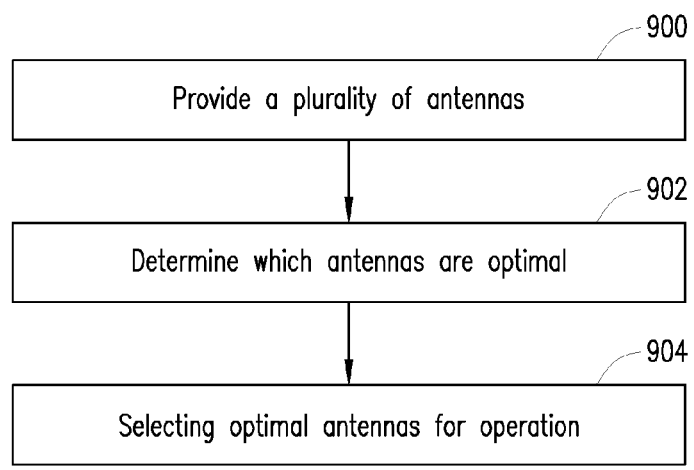
FIG. 9 illustrates a flowchart of a method for optimizing antenna selection according to one embodiment.

FIG. 9 depicts one embodiment of a method for optimizing antenna selection in either a receive or a transmit mode. In block 900, a plurality of antennas are provided. In block 902, diversity controller 314 determines which antennas are optimal for operation of the mobile communication device. As above, determination may be based on, for example, the relative strength of received signals or the state of certain sensors. In block 904, the optimal antennas are selected for operation of the mobile communication device.

According to one embodiment, a method of operating a mobile communications device may include both receiving and transmitting signals via two or more antennas. Initially, signals are received via each of the antennas and analyzed. Based on the analysis, a received signal transformation algorithm and outgoing signal transformation algorithm is selected or generated for each of the antennas. A resultant received signal can then be generated from the received signals using the received signal transformation algorithms, and a set of transformed outgoing signals can be generated from a raw outgoing signal according to the outgoing signal transformation algorithms. The transformed outgoing signals can then be transmitted via the antennas associated therewith.

Although the foregoing disclosure has been described in relation to certain particular applications and embodiments, those of skill in the art will recognize that other variations are contemplated and within the spirit of the present disclosure.

What is claimed is:

1. A mobile communication device comprising:
    a first antenna operable to receive a first received signal, said first antenna being disposed substantially in a plane and having a first polarity;
    a second antenna operable to receive a second received signal, said second antenna being disposed substantially coplanar with said first antenna and having a second polarity substantially orthogonal to said first polarity;
    a transceiver operably connected to said first antenna and to said second antenna; and
    a controller operably connected to a memory having instructions that when executed by said controller generates, based on determining that one of the first received signal and the second received signal is weak, a resultant received signal from a remaining signal of the first received signal and the second received signal.

2. The mobile communication device of claim 1 wherein said first antenna and said second antenna have locations at opposed ends of the mobile communication device.

3. The mobile communication device of claim 2 wherein said locations provide for high antenna system efficiency for a holding position adjacent said first antenna.

4. The mobile communication device of claim 1 wherein the mobile communication device is a data communication device.

5. The mobile communication device of claim 1 wherein the mobile communication device is a multifunction communication device having voice and data communication capabilities.

6. The mobile communication device of claim 1 wherein the mobile communication device is a personal digital assistant (PDA).

7. The mobile communication device of claim 1 wherein the mobile communication device is a computer.

8. The mobile communication device of claim 7 wherein the computer is a laptop computer.

9. A method of operating a mobile communications device having a housing, a wireless transceiver and a plurality of antennas connected to the wireless transceiver, the method comprising:
    determining a strength of a first signal received via a first antenna disposed substantially in a plane and having a first polarity;
    determining a strength of a second signal received via a second antenna disposed substantially co-planar with the first antenna and having a second polarity substantially orthogonal to the first polarity; and
    based on determining that one of the first signal and the second signal is weak, generating a resultant received signal from a remaining signal of the first and second signals.

10. The method of claim 9 wherein a signal transformation technique is operable to manipulate the remaining signal to generate the resultant received signal.

11. The method of claim 10 wherein the signal transformation technique is operable to attenuate the remaining signal to generate the resultant received signal.

12. The method of claim 10 wherein the signal transformation technique is operable to amplify the remaining signal to generate the resultant received signal.

13. The method of claim 9 wherein the resultant received signal is identical to one of the first and second received signals.

* * * * *